(12) United States Patent
Ramezanipour et al.

(10) Patent No.: US 11,311,857 B2
(45) Date of Patent: Apr. 26, 2022

(54) CATALYST FOR WATER SPLITTING REACTIONS

(71) Applicant: University of Louisville Research Foundation, Inc., Louisville, KY (US)

(72) Inventors: Farshid Ramezanipour, Louisville, KY (US); Ram K. Hona, Louisville, KY (US); Surendra B. Karki, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 84 days.

(21) Appl. No.: 16/868,923

(22) Filed: May 7, 2020

(65) Prior Publication Data

US 2021/0046453 A1   Feb. 18, 2021

Related U.S. Application Data

(60) Provisional application No. 62/846,147, filed on May 10, 2019.

(51) Int. Cl.
| | |
|---|---|
| *B01J 23/00* | (2006.01) |
| *B01J 27/20* | (2006.01) |
| *C25B 1/04* | (2021.01) |
| *B01J 37/00* | (2006.01) |
| *B01J 37/08* | (2006.01) |
| *C25B 11/043* | (2021.01) |
| *C25B 11/077* | (2021.01) |

(52) U.S. Cl.
CPC ............. *B01J 23/002* (2013.01); *B01J 27/20* (2013.01); *B01J 37/0036* (2013.01); *B01J 37/08* (2013.01); *C25B 1/04* (2013.01); *C25B 11/043* (2021.01); *C25B 11/077* (2021.01)

(58) Field of Classification Search
CPC .... B01J 23/002; B01J 23/005; B01J 23/8892; B01J 27/20; B01J 35/002; B01J 37/0036; B01J 37/0063; B01J 37/04; B01J 37/08; B01J 37/088; B01J 2523/00; C25B 1/04; C25B 11/043; C25B 11/052; C25B 11/054; C25B 11/065; C25B 11/077; C25B 11/0773; Y02E 60/36
See application file for complete search history.

(56) References Cited

U.S. PATENT DOCUMENTS

| | | | | |
|---|---|---|---|---|
| 5,356,728 | A | * 10/1994 | Balachandran | ......... C04B 35/01 429/8 |
| 2009/0023580 | A1* | 1/2009 | Tanaka | ................... B01J 37/033 502/171 |
| 2020/0123668 | A1* | 4/2020 | He | ........................... C25B 9/73 |

OTHER PUBLICATIONS

Hona, R.K. (2019) Oxygen Deficient Perovskites: Effect of Structure on Electrical Conductivity, Magnetism, and Electrocatalytic Activity, PhD Dissertion, Department of Chemistry, Univeristy of Louisville, 238 pgs.*
Ramezanipour, F. et al. (2012) Journal of the American Chemical Society, 134(6), 3215-3227.*

* cited by examiner

*Primary Examiner* — Brian A McCaig
(74) *Attorney, Agent, or Firm* — WCF IP

(57) ABSTRACT

A perovskite-type oxide catalyst for water-splitting reactions is provided. The catalyst, $Ca_{2-y}Sr_yFe_{1-x}Co_{1-x}Mn_{2x}O_{6-\delta}$ where y=0.10-1.90 and x=0.05-0.95, has catalytic activity for both hydrogen- and oxygen-evolution reactions. An exemplary catalyst is $CaSrFe_{0.75}Co_{0.75}Mn_{0.5}O_{6-\delta}$.

22 Claims, 6 Drawing Sheets

Figure 2A
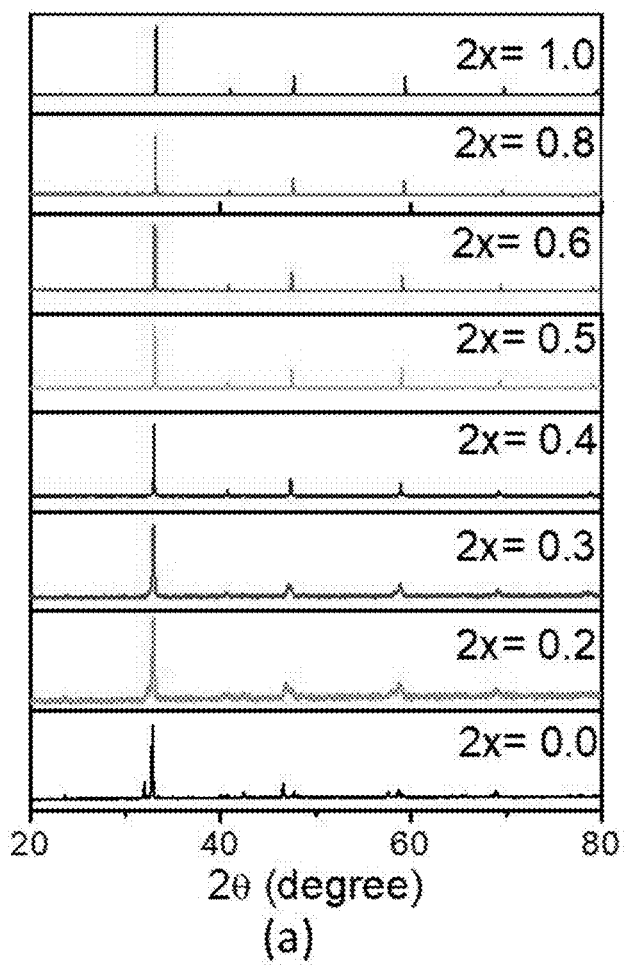
(a)
Figure 2B
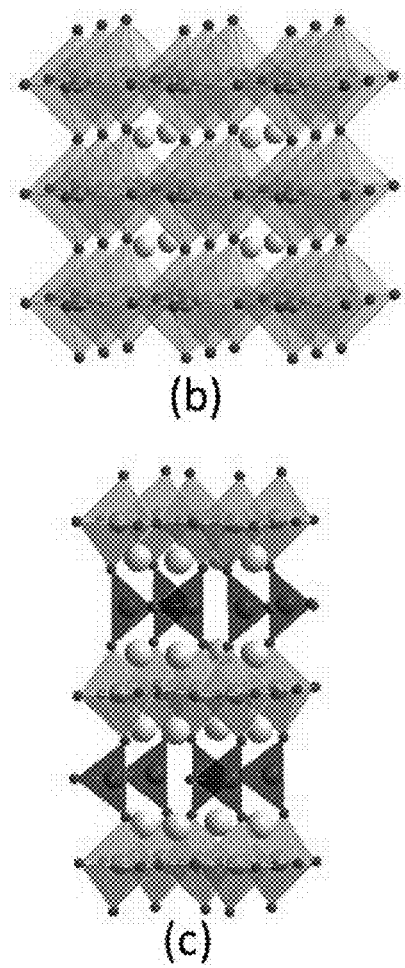
(b)
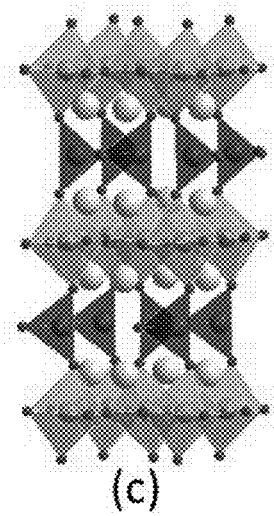
(c)
Figure 2C

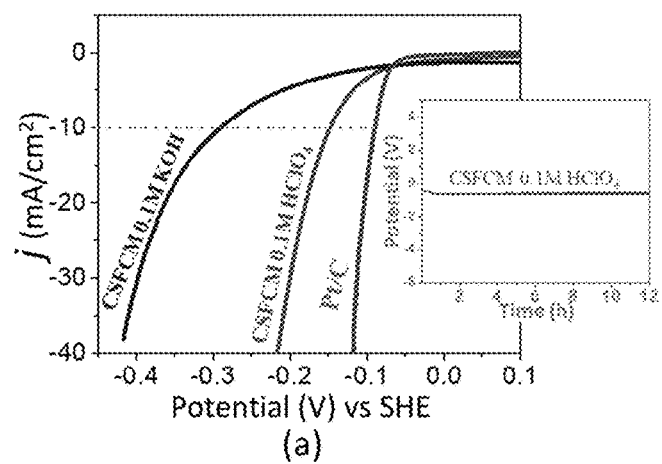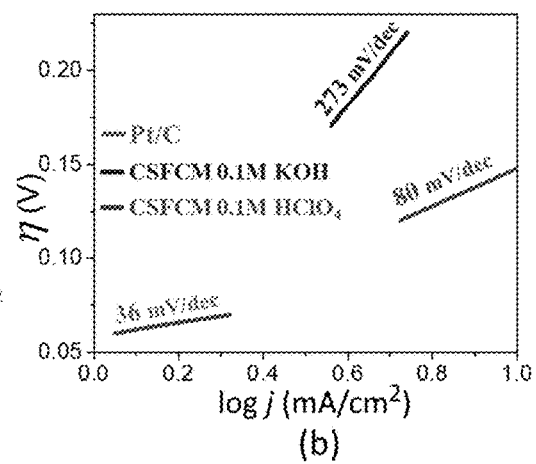
Figure 5A                    Figure 5B

Figure 6A
Figure 6B
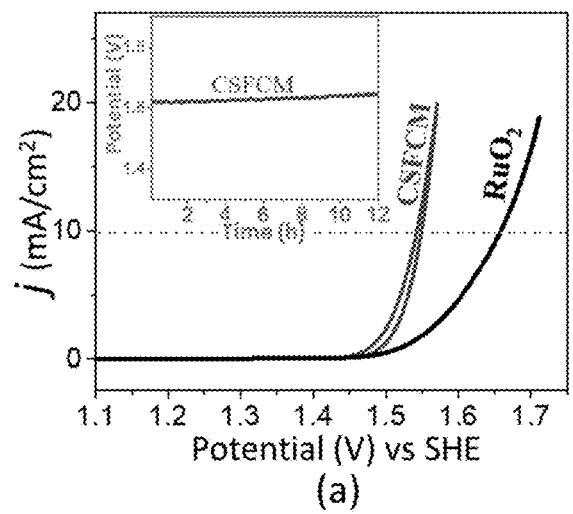
(a)
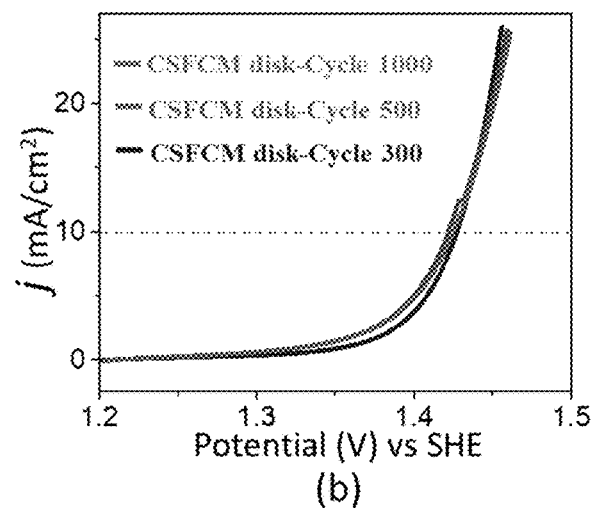
(b)
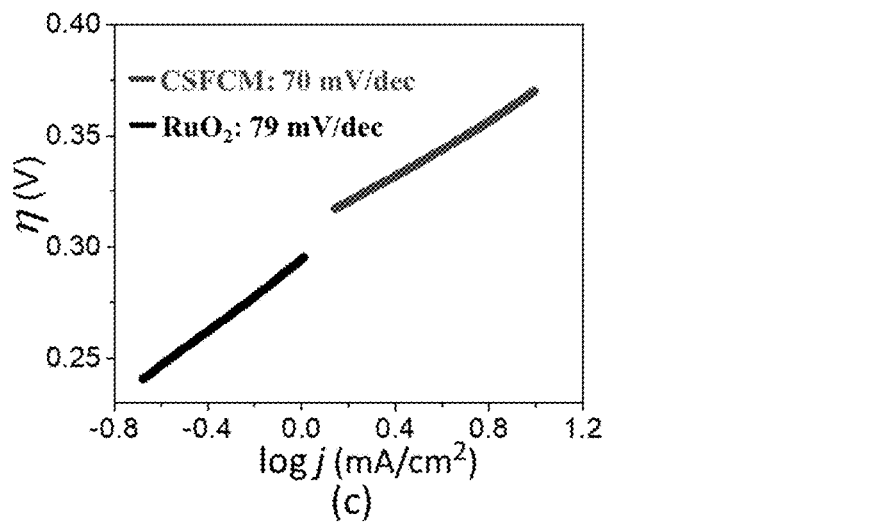
(c)
Figure 6C

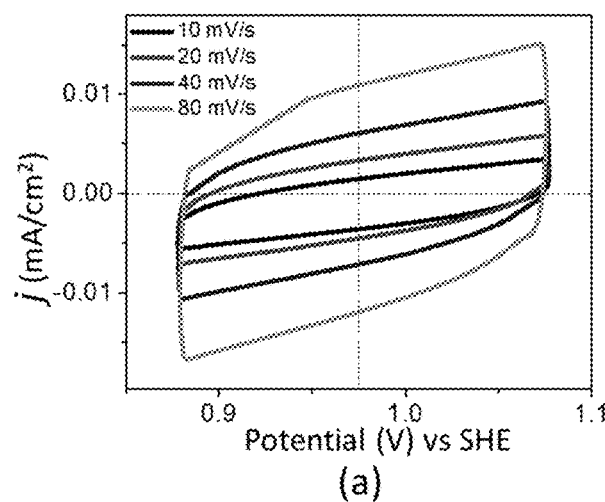 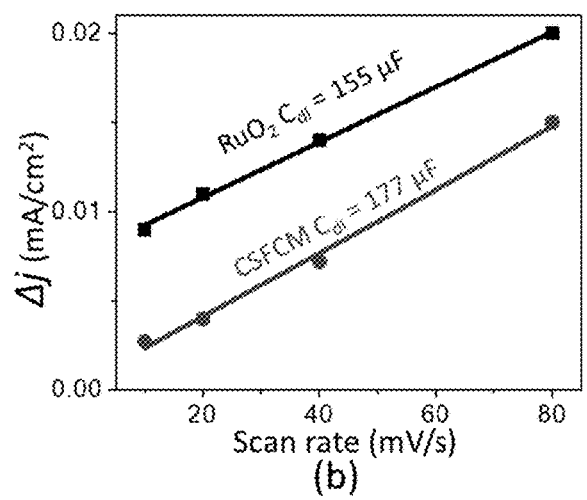
Figure 7A                                   Figure 7B

CATALYST FOR WATER SPLITTING REACTIONS

CROSS REFERENCE TO RELATED APPLICATIONS

This application claims the benefit of U.S. Provisional Application No. 62/846,147, filed May 10, 2019.

BACKGROUND OF THE INVENTION

Field of the Invention

This invention generally relates to catalysts for water-splitting reactions. In particular, the invention provides an oxide catalyst, $Ca_{2-y}Sr_yFe_{1-x}Co_{1-x}Mn_{2x}O_{6-\delta}$ (where y=0.10-1.90 and x=0.05-0.95) which has exceptional catalytic activity for both hydrogen and oxygen evolution reactions. An exemplary form of the catalyst is $CaSrFe_{0.75}Co_{0.75}Mn_{0.5}O_{6-\delta}$.

State of Technology

The research on finding novel catalysts for water splitting is essential. This process involves two half-reactions, i.e., oxygen-evolution and hydrogen evolution. The oxygen evolution reaction (OER) is important in water splitting[1] as well as other areas such as solar energy,[2] metal-air batteries,[3] and regenerative fuel cells.[4] Nevertheless, this reaction has a very high activation energy,[5] and conventional OER catalysts, such as $IrO_2$ and $RuO_2$, are costly. Therefore, there has been much research focused on the discovery of new catalysts based on earth-abundant metals. One promising class of compounds for OER catalysis are oxygen-deficient perovskites, with general formula $ABO_{3-\delta}$, comprising $BO_{6-\delta}$ octahedra. The larger A cations are located in spaces between the above octahedra (FIG. 1) and some of the oxygen positions are empty. Several oxygen-deficient perovskite compounds have shown good OER activity, such as $Sr_2Fe_2O_{6-\delta}$,[6] $SrNb_{0.1}Co_{0.7}Fe_{0.2}O_{3-\delta}$,[7] $SrCo_{0.9}Ti_{0.1}O_{3-\delta}$,[8] $Pr^{0.5}Ba^{0.3}Ca^{0.2}CoO_{3-\delta}$,[9] and $Ba_{0.5}Sr_{0.5}Co_{0.8}Fe_{0.2}O_{3-\delta}$ (BSCF).[1] The latter catalyst, also known as BSCF, in often used as a reference to compare the OER activity of oxygen-deficient perovskites.

For the other half reaction of water splitting, i.e., hydrogen evolution reaction (HER), Pt/C catalyst shows very high activity, but again its high cost is an issue that needs to be addressed. As a result, a variety of compounds have been investigated as catalysts for HER. Examples are phosphides,[10] sulphides,[11] nitrides,[12] carbides,[12] and oxides.[13] Even though oxygen-deficient perovskites have shown good OER activity, very few of them exhibit activity toward HER in basic condition.[14-15] Furthermore, it is highly uncommon for perovskite-type oxides based on non-precious metals to exhibit HER activity in acidic media. One report that briefly tested La-based perovskites, showed very low activity in acidic solution.[16]

The filling of eg orbitals has been suggested as a descriptor for water-splitting catalysts. Initially, this descriptor was proposed to explain the performance of some OER electrocatalysts,[1, 8, 17] but in recent years it has been suggested that the correlation between activity and eg orbital filling can be applied to HER catalysts as well.[18-19]

Bifunctional catalysts that can catalyze both half-reactions of water-splitting are less common, in particular among perovskite-type oxides. There are various bifunctional catalysts which rely on expensive metals such as Ru, Ir or Rh.[20-22] Some bifunctional catalysts comprising multicomponent composites[22-23] have also been reported. Even though there are some single-phase bifunctional catalysts, they often need nanofabrication.[24-25] Single phase materials that show bifunctional catalytic activity in bulk form are rare.

SUMMARY OF THE INVENTION

The present disclosure describes a remarkable bifunctional perovskite oxide, which can catalyze both half reactions of water splitting in bulk form. It does not require nanofabrication, composite preparation or other types of processing. The catalyst also shows remarkably low overpotential and outstanding stability. Particularly, the HER activity of this perovskite-based catalyst is unprecedented, as it can catalyze the HER in both acidic and basic media, with an overpotential that is only slightly higher than that of platinum.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

It is an object of this invention to provide a catalytic material with formula: $Ca_{2-y}Sr_yFe_{1-x}Co_{1-x}Mn_{2x}O_{6-\delta}$ where y=0.10-1.90 and x=0.05-0.95. In some aspects, the formula of the material is $CaSrFe_{0.75}Co_{0.75}Mn_{0.5}O_{6-\delta}$.

It is a further object to provide a catalyst ink comprising the catalytic material $Ca_{2-y}Sr_yFe_{1-x}Co_{1-x}Mn_{2x}O_{6-\delta}$ where y=0.10-1.90 and x=0.05-0.95, and a liquid carrier. In some aspects, the catalytic material is $CaSrFe_{0.75}Co_{0.75}Mn_{0.5}O_{6-\delta}$.

A further object provides an electrode comprising the catalytic material $Ca_{2-y}Sr_yFe_{1-x}Co_{1-x}Mn_{2x}O_{6-\delta}$ where y=0.10-1.90 and x=0.05-0.95. In some aspects, the catalytic material is $CaSrFe_{0.75}Co_{0.75}Mn_{0.5}O_{6-\delta}$. In some aspect, the electrode does not comprise carbon.

Also provided is a method of making the catalytic material $Ca_{2-y}Sr_yFe_{1-x}Co_{1-x}Mn_{2x}O_{6-\delta}$ where y=0.10-1.90 and x=0.05-0.95, comprising grinding stoichiometric proportions of a solid compound comprising Ca, a solid compound comprising Sr, a solid compound comprising Fe, a solid compound comprising Mn and a solid compound comprising Co to form a ground mixture; compressing the ground mixture to form a compressed mixture; and i) sintering the compressed mixture to form a sintered compressed mixture and ii) cooling the sintered compressed mixture; or iii) grinding the compressed mixture to form a powder, iv) recompressing and calcining the compressed mixture, v) sintering the compressed mixture, and vi) cooling the sintered compressed mixture. In some aspects, the step of calcining is performed in air at 1000° C. for 24 hours. In some aspects, steps i) and v) of sintering are performed in air at 1200° C. for 24 hours. In further aspects, the solid compound comprising Ca is $CaCO_3$, CaO, or $Ca(NO_3)_2$; the solid compound comprising Sr is $SrCO_3$, SrO, $Sr(NO_3)_2$; the solid compound comprising Fe is $Fe_2O_3$, FeO, or $Fe_3O_4$; the solid compound comprising Mn is $Mn_2O_3$, MnO, $MnO_2$; and the solid compound comprising Co is $Co_3O_4$ or CoO. In some aspects, the catalytic material is $CaSrFe_{0.75}Co_{0.75}Mn_{0.5}O_{6-\delta}$.

Also provided is a method of making a catalytic electrode using a catalytic material $Ca_{2-y}Sr_yFe_{1-x}Co_{1-x}Mn_{2x}O_{6-\delta}$ where y=0.10-1.90 and x=0.05-0.95, comprising i) mixing the electrolytic material and a carrier to form a catalytic ink, and coating the catalytic ink onto a substrate to form the catalytic electrode; or ii) forming a solid catalytic electrode from the catalytic material. In some aspects, the step of coating is performed by drop casting. In additional aspects, the catalytic ink further comprises carbon black. In further aspects, the carrier comprises one or more of water, an alcohol, and a solvent. In yet further aspects, the substrate is a glassy carbon electrode. In other aspects, the substrate does not comprise carbon. In some aspects, the catalytic material is $CaSrFe_{0.75}Co_{0.75}Mn_{0.5}O_{6-\delta}$.

Also provided is a method of catalyzing a hydrogen evolution reaction (HER), comprising contacting water with the catalytic material $Ca_{2-y}Sr_yFe_{1-x}Co_{1-x}Mn_{2x}O_{6-\delta}$ where y=0.10-1.90 and x=0.05-0.95, wherein the step of contacting is performed under conditions that permit catalysis of the HER by the catalytic material. In some aspects, the conditions that permit catalysis include performing the step of contacting under strongly acidic conditions or under strongly basic conditions. In some aspects, the catalytic material is $CaSrFe_{0.75}Co_{0.75}Mn_{0.5}O_{6-\delta}$.

Also provided is a method of catalyzing an oxygen evolution reaction (OER), comprising contacting water with the catalytic material $Ca_{2-y}Sr_yFe_{1-x}Co_{1-x}Mn_{2x}O_{6-\delta}$ where y=0.10-1.90 and x=0.05-0.95, wherein the step of contacting is performed under conditions that permit catalysis of the OER by the catalytic material. In some aspects, the conditions that permit catalysis include performing the step of contacting under strongly acidic or under strongly basic conditions. In some aspects, the catalytic material is $CaSrFe_{0.75}Co_{0.75}Mn_{0.5}O_{6-\delta}$.

Also provided is a device comprising the catalytic material $Ca_{2-y}Sr_yFe_{1-x}Co_{1-x}Mn_{2x}O_{6-\delta}$ where y=0.10-1.90 and x=0.05-0.95. In some aspects, the device is an electrolyzer. In some aspects, the catalytic material is $CaSrFe_{0.75}Co_{0.75}Mn_{0.5}O_{6-\delta}$.

Also provided is a calcium, strontium, iron, cobalt, manganese oxide perovskite which catalyzes a hydrogen evolution reaction.

Also provided is a calcium, strontium, iron, cobalt, manganese oxide perovskite of claim 20 which catalyzes an oxygen evolution reaction.

BRIEF DESCRIPTION OF THE DRAWINGS

FIG. 2A-C. (A) Change in the X-ray diffraction data for $CaSrFe_{1-x}Co_{1-x}Mn_{2x}O_{6-\delta}$ as a function of Mn-concentration. (B) Brownmillerite structure of 2x=0-0.2 phases. (C) Perovskite structure of 2x=0.5-1.0 phases.

FIGS. 5A and B. (A) HER polarization curves for CSFCM in acidic and basic conditions. The activity in 0.5 M $H_2SO_4$ is not shown, as it is very similar to that in 0.1 M $HClO_4$. The inset shows the stability over 12 hours in 0.1 M $HClO_4$. (B) Tafel slopes for CSFCM in acidic and basic conditions.

FIGS. 6A-C. (A) OER polarization curves for CSFCM and $RuO_2$ in 0.1 M KOH. The inset shows stability over 12 hours. (B) OER polarization curves for pure disk of CSFCM without glassy carbon electrode or any additives. Note the excellent performance over 1000 cycles. (C) Tafel slopes.

FIGS. 7A and B. (A) Cyclic voltammetry data in non-faradic region with different scan rates for CSFCM. (B) The plot of Δj versus scan rate. The value of double layer capacitance, $C_{dl}$, is equivalent to half of the slope of this plot.

DETAILED DESCRIPTION

Figure 1A:
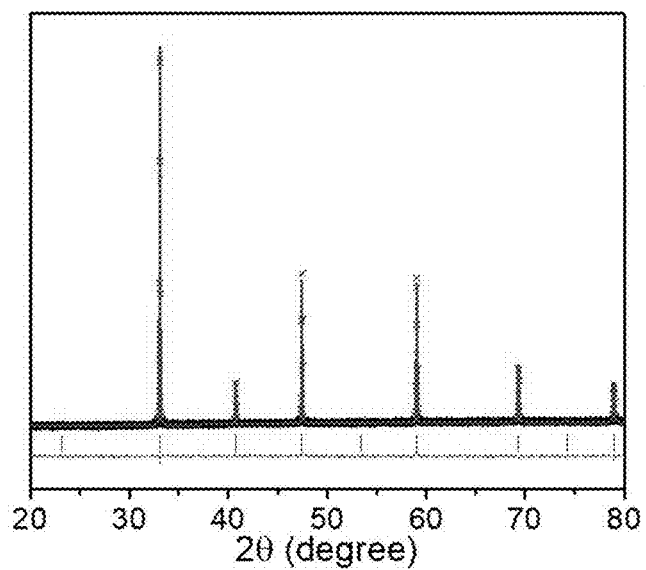
FIGS. 1A and B. Rietveld refinement profile (A) and crystal structure (B) of CSFCM.

Provided herein is a novel catalytic material, $Ca_{2-y}Sr_yFe_{1-x}Co_{1-x}Mn_{2x}O_{6-\delta}$ (where y=0.10-1.90 and x=0.05-0.95) (CSFCM) which catalyzes both HER and OER reactions of e.g. water splitting. Surprisingly, CSFCM shows outstanding HER activity in both acidic and basic conditions, an unprecedented property for a perovskite-type oxide. CSFCM is advantageously active in bulk form with no additional processing. In addition, this material shows remarkable stability, e.g. exhibiting extended catalytic activity. Provided herein are methods of making the catalytic material, methods and using the catalytic material, and other inventive aspects related thereto. An exemplary form of this novel catalytic material is $CaSrFe_{0.75}Co_{0.75}Mn_{0.5}O_{6-\delta}$.

In the formula $Ca_{2-y}Sr_yFe_{1-x}Co_{1-x}Mn_{2x}O_{6-\delta}$, y ranges from about 0.10-1.90, and is for example about 0.10, 0.20, 0.30, 0.40, 0.50, 0.60, 0.70, 0.80, 0.90, 1.0, 1.1, 1.2, 1.3, 1.4, 1.5, 1.6, 1.7 or 1.9; and x ranges from about 0.05 to about 0.95, and is for example about 0.05, 0.1, 0.2, 0.3, 0.4, 0.5, 0.6, 0.7, 0.8, 0.9 or 0.95.

Methods of Making the Catalyst

The present disclosure provides methods of making the catalytic material described herein. Generally, the methods involve mixing or combining compounds comprising the components of the material: Ca, Sr, Fe, Mn and Co, and oxygen. The compounds are generally procured in powder form and are ground, pulverized or otherwise blended together to form a powdered mixture. Exemplary compounds that may be used to form the catalytic material include but are not limited to: as a source of Ca: $CaCO_3$, CaO, $Ca(NO_3)_2$; as a source of Sr: $SrCO_3$, SrO, $Sr(NO_3)_2$; as a source of Fe: $Fe_2O_3$, FeO, $Fe_3O_4$; as a source of Mn: $Mn_2O_3$, MnO, $MnO_2$; and as a source of Co: $Co_3O_4$, CoO.

The powdered mixture is then compressed into a compressed form e.g. into a pellet or pellets or another solid, compressed form that is convenient for further processing (e.g. a block).

The compressed form of the mixture is then calcined to form a calcined pellet, block etc. for example, by heating at a temperature of from about 900 to about 1100° C., such as to about 1000° C., for a period of time ranging from e.g. about 12-48 hours, such as about 24 hours. The calcining step is generally conveniently performed in air.

The calcined material is then optionally (depending on its intended use) reground (pulverized, etc.) to form a particulate or powdered calcined material, and that reground material is compressed, then sintered by heating to a temperature in the range of from about 1000 to 1400° C., such as about 1200° C. The sintering step is generally performed for a period of time ranging from e.g. about 12-48 hours, such as about 24 hours, and is generally conveniently performed in air. The sintered material is then cooled and ready for use.

Methods of Making an Electrode

The CSFCM, after being treated as described in the previous section, can be used to form catalytic electrodes using at least two different methods.

Method One

In a first method, which is the simplest, the CSFCM pellet, or block, etc. is used as the electrode, i.e. the CSFCM is not coated on a substrate material. Instead, a CSFCM disk formed by compression as described above is heated to temperature in the range of from about 1000 to 1400° C., such as about 1200° C. as described above for sintering and is used directly. The sintering step is generally performed for a period of time ranging from e.g. about 12-48 hours, such as about 24 hours, and is generally conveniently performed in air.

Method Two

In some aspects, the CSFCM material is used to form a catalytic ink which is applied to a substrate or support to form an electrode. This typically involves the application of one or more coatings (e.g. at least one, and generally between 1 and 10 coatings) to the substrate. Generally, the ink is made by suspending ground CSFCM (CSFCM in powder form) in a carrier and/or solvent. Typical carriers and solvents which may be used to form the ink include but are not limited to: various alcohols such as ethanol, various solvents such as tetrahydrofuran (THF), etc. It is noted that some commercial products exist which are carriers for this purpose, for example, NAFION®. As used herein, the term carrier may refer collectively to all the liquid components of the catalytic ink.

Typically, the amount of CSFCM in the carrier ranges from about 1 mg to about 20 mg (e. g., about 1, 2, 5, 7, 10, 15, or 20 mg) per mL of ink. and is preferably of a viscosity to permit ready application to a substrate, such as by coating (which includes drop casting, spraying, etc.).

In some aspects, carbon black is also added to the ink, e.g. in an amount ranging from about 0.1 mg to about 5 mg such as 0.1, 0.5, 1, 2, 3, 4, or 5 mg per mL of ink. In other aspects, due to the excellent catalytic properties of the CSFCM, carbon black is not included and the inks and catalysts of the disclosure do not include carbon black.

In some aspects, to form a useful catalytic electrode, one or more coatings of the CSFCM catalytic ink are applied to a substrate or support. In some aspects, the substrate is a glassy carbon substrate. However, other substrates may also be used, including but not limited to nickel foam, etc.

Catalyzed Reactions and Reaction Methods

Also provided are methods of catalyzing chemical reactions using the disclosed catalytic materials. In some aspects, the reactions are those involved in water splitting, namely HER and OER reactions. However, the CSFCM may be used in any reaction that is amenable to catalysis by this material. Examples include but are not limited to the formation of different products from $CO_2$ reduction, $N_2$ reduction, other electrochemical and photochemical reactions, etc.

HER Reactions

In some aspects, electrodes formed from or which include CSFCM ("CSFCM catalysts") are used to catalyze HER reactions e.g. to generate hydrogen from water. When the HER reactions are part of a process of water splitting, the steps of the method include contacting water with a CSFCM catalyst under conditions that permit (allow, foster, etc.) the evolution of hydrogen from the water. The step of contacting is performed for a period of time sufficient to generate $H_2$ from the $H_2O$ for the intended purpose. Since in most devices the products of the reaction are generally removed immediately and a constant source of water is provided, the reaction can usually be conducted in a continuous manner for an indefinite period of time.

The CSFCM catalysts described herein advantageously can catalyze HER under both acidic and basic conditions.

As used herein, "acidic conditions" (generally "strong acidic conditions") for conducting HER reactions using a CSFCM catalyst include but are not limited to: conducting the reaction at a pH that is at least below 7.0, and is typically below, e.g. about 6, 5, 4, 3, 2 or 1. In some aspects, "acidic conditions" refer to conditions that have a pH that is generally about 4 or less e.g. about 3.0, 2.5, 2.0, 1.5, 1.0, 0.5, or 0 or less, i.e. the pH may be negative, such as about −1 or −2. A typical pH range for strongly acidic reactions is from about 0 to about 2. To achieve these conditions, the reactions may be conducted, e.g. in acids such as $HClO_4$ and $H_2SO_4$. The strength of acid that is used varies depending on the type. Examples include: 0.1M $HClO_4$ and 0.5 M $H_2SO_4$.

As used herein, "basic conditions" (usually "strong basic conditions") for conducting HER reactions using a CSFCM catalyst include but are not limited to: conducting the reaction at a pH that is at least higher than 7.0, and is typically higher than, e.g. about 8, 9, 10, 11 or 12. In some aspects, "basic conditions" refer to conditions that have a pH greater than 12. A typical pH range for strongly alkaline (basic) reactions is from about 12 to about 14. To achieve these conditions, the reactions may be conducted, e.g. in bases such as KOH, NaOH, etc. The strength of base that is used varies depending on the type and concentration. Examples include: 0.1 M KOH, 1M KOH, etc.

While the reaction proceeds in both acidic and basic conditions, the HER energy barrier is lower in acidic condition, where the O—H bond between hydrated proton and water molecule is dissociated. In contrast, in alkaline conditions, the reaction mechanism involves the dissociation of the O—H bond within water molecules, a considerably higher energy barrier. In addition, the transport of protons in solution is faster than that of OH⁻ ions.

For HER reactions conducted under acidic conditions, the overpotential required to achieve the current density of 10 mA/cm²($\eta 10$) for CSFCM shows an onset of at least about −0.077 V and an overpotential of at least about −0.145 V. Thus, CSFCM is an extremely efficient catalyst.

OER Reactions

In some aspects, electrodes formed from or which include CSFCM are used to catalyze OER reactions (water electrolysis), generally under acidic conditions. When the OER reactions are part of a process of water splitting, the steps of the method include contacting water with the CSFCM catalysts under conditions that permit, allow or foster the evolution of oxygen from the water. The step of contacting is performed for a period of time sufficient to generate $O_2$ from the $H_2O$ for the intended purpose. Since in most devices the products of the reaction are generally removed immediately and a constant source of substrate water is provided continuously, the reaction can usually be conducted in a continuous manner for an indefinite period of time.

The acidic and basic conditions for conducting OER reactions are similar to those for conducting HER reactions under "acidic conditions" and "basic conditions" as described above.

Accordingly, products that can be produced using the CSFCM catalysts described herein include $H_2$ gas, and thus methods of generating $H_2$ gas (e.g. by contacting water with the catalysts) are also encompassed. The $H_2$ gas may be used as a fuel (hydrogen fuel) and methods of generating hydrogen fuel (e.g. by contacting water with the catalysts) are also encompassed. $H_2$ fuel generated in this manner may be used for any of a variety of purposes, for example, in internal combustion engines, in fuel cells, as a chemical reactant for ammonia formation or hydrogenation, etc.

In addition, $O_2$ gas can be produced using the CSFCM catalysts described herein and thus methods of generating $O_2$ gas (e.g. by contacting water with the catalysts) are also encompassed. The $O_2$ gas may be used in a variety of applications, including but not limited to: generating $O_2$ gas for breathing in low oxygen environments such as in outer space, under water, at high altitudes, in medical settings where oxygen is needed, etc.

Stability

The CSFCM catalytic material described herein is advantageously very stable in both strong acid and in strong base. In addition, CSFCM catalysts are able to exhibit useful activity for long periods of time, e.g. for at least about 10 hours, and typically for as long as 15-20 hours or more. In addition, their activity remains high over e.g. at least about 500-2000 cycles, such as for at least about 1000 OER catalytic cycles.

Devices

The disclosed catalytic materials may be incorporated into a wide variety of devices and/or may be a part of a device that employs catalysts. Examples include but are not limited to: electrolyzers; Proton Exchange Membranes (PEMs) and the electrolyzers that use them as separators; devices in which the PEMs are used such as hydrogen fuel cells; in photocatalytic water splitting cells (e.g. which use artificial or natural (solar) light); devices which catalyze $CO_2$ or $N_2$ reduction, redox flow batteries, metal-air batteries, etc.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

All patents and publications mentioned in the specification are indicative of the level of those skilled in the art to which the invention pertains. All patents and publications are herein incorporated by reference in their entirety to the same extent as if each individual publication was specifically and individually indicated to be incorporated by reference.

EXAMPLE

1. Abstract

An exceptional catalyst for water-splitting is reported using a combination of experimental and computational data. To our knowledge, this is the first oxide electrocatalyst based on non-precious metals that demonstrates the unprecedented combination of properties as follows: (a) Exceptional catalytic activity for hydrogen-evolution reaction (HER), with overpotential $\eta=-0.15$ V at 10 $mA/cm^2$. (b) Remarkable activity for oxygen-evolution reaction (OER), with $\eta=0.19$ V at 10 mA/cm2. (c) The ability to catalyze HER effectively in both acidic and basic conditions. (d) Extremely high stability over hundreds of cycles of catalysis. (e) Catalytic activity as a single-phase bulk material, without the need for multi-component composite preparation or nanofabrication. Therefore, this material's catalytic activity is intrinsic, making it an excellent benchmark compound for studying the parameters that affect the catalytic properties. Unlike precious metal catalysts, the new compound, $CaSrFe_{0.75}Co_{0.75}Mn_{0.5}O_{6-\delta}$, has enough electrical conductivity to catalyze OER as a pure disk without any additives or electrode preparation.

2. Experimental 2.1. Synthesis and structural characterization. Solid-state synthesis method was used to prepare all materials. The powders of the precursor compounds $CaCO_3$ (Alfa Aesar, 99.95%), $SrCO_3$ (Alfa Aesar 99.95%), $Fe_2O_3$ (Alfa Aesar, 99.998%), $Mn_2O_3$ (Sigma Aldrich, 99.99%) and $Co_3O_4$ (Alfa Aesar, 99.7%), were mixed in stoichiometric proportions and ground together using an agate mortar and pestle, then pressed into a pellet and calcined in air at 1000° C. for 24 h. The samples were then reground and sintered at 1200° C. for 24 h in the same environment, followed by slow cooling. The heating and cooling rates were 100° C./h in all cases. The structure of the polycrystalline materials were determined by Rietveld analyses with powder X-ray diffraction using CuKα1 radiation (λ=1.54056 Å). The GSAS software[26] and EXPEGUI interface[27] were used for Rietveld refinements.

2.2. Electrode preparation and electrochemical measurements. Catalyst ink for HER was prepared by sonicating the mixture of 35 mg perovskite powder, 40 μL NAFION™ and 7 mL tetrahydrofuran (THF) for 30 minutes. Then 40 μL of ink was dropcasted (four coatings of 10 μL each) on the surface of a glassy carbon electrode (with area of 0.196 cm²) and allowed to air-dry overnight. Experiments were also done by addition of 7 mg carbon black to the above mixture. For the best catalyst, the results with or without carbon black were similar, indicating that this catalyst does not need carbon powder for its activity. However, the reference catalyst, $RuO_2$, has low conductivity and requires the addition of carbon black to enhance the conductivity.

Electrocatalytic OER experiments were done using a three-electrode setup. The glassy carbon electrode loaded with catalyst was used as working electrode and was rotated using a rotating disk electrode system at 1600 rpm. A commercial Pt electrode and silver/silver chloride electrode were used as counter and reference electrodes, respectively. The OER cyclic voltammetry data were recorded at a scan rate of 10 mV s−1 versus Ag/AgCl (3 M KCl), as commonly done for OER experiment.[7-9, 28] The potential range that was scanned in OER experiments was 0.0 to 0.8 V (vs Ag/AgCl) for basic and 0.0 to 2.1 V (vs Ag/AgCl) for acidic condition. The HER data were obtained at a scan rate of 20 mV s−1 in versus Ag/AgCl (4 M KCl), as commonly utilized in HER.[29-31] The potential range that was scanned in HER experiments was −0.5 to −1.6 V (vs Ag/AgCl) for basic and 0.0 to −1.0 V (vs Ag/AgCl) for acidic condition.

The measured potential values versus silver/silver chloride ($E_{Ag/AgCl}$) were converted to be expressed against RHE according to the equation $E_{RHE}=E_{Ag/AgCl}+0.059$ pH+$E°_{Ag/AgCl}$, where $E°_{Ag/AgCl}$=0.21 V for 3M KCl[28] and 0.197 V for 4 M KCl.[32]

Chronopotentiometry experiments were conducted to test the stability of the catalyst by applying the current of 10 mA and measuring the potential over time.

3. Results and Discussion 3.1. Crystal Structure

Figure 1B:
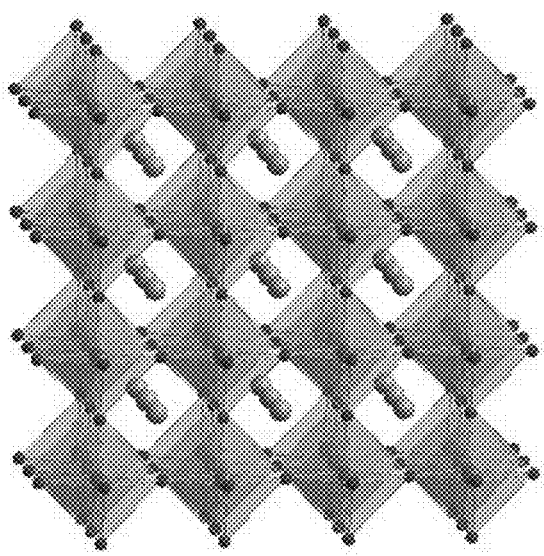
Figure 3A:
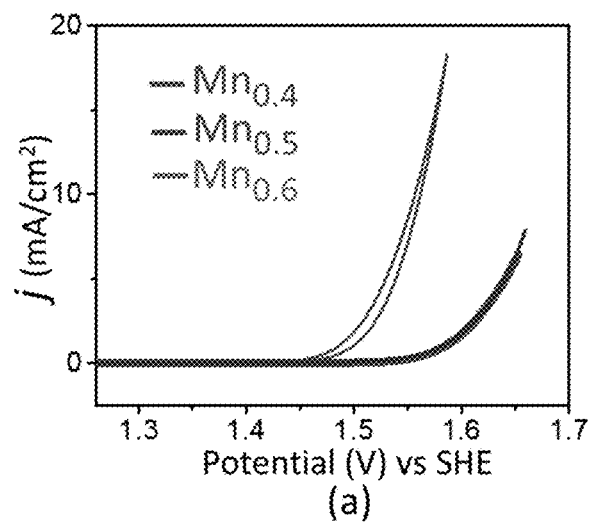
FIGS. 3A and B. Representative examples of the effect of Mn-concentration. The electrocatalytic activities of $CaSrFe_{0.8}Co_{0.8}Mn_{0.4}O_{6-\delta}$, $CaSrFe_{0.75}Co_{0.75}Mn_{0.5}O_{6-\delta}$ and $CaSrFe_{0.7}Co_{0.7}Mn_{0.6}O_{6-\delta}$ are compared for (A) OER and (B) HER FIGS. 4A and B. OER polarization curves for CSFCM in (A) 0.1 M $HClO_4$ and (B) 1 M KOH.
Figure 3B:
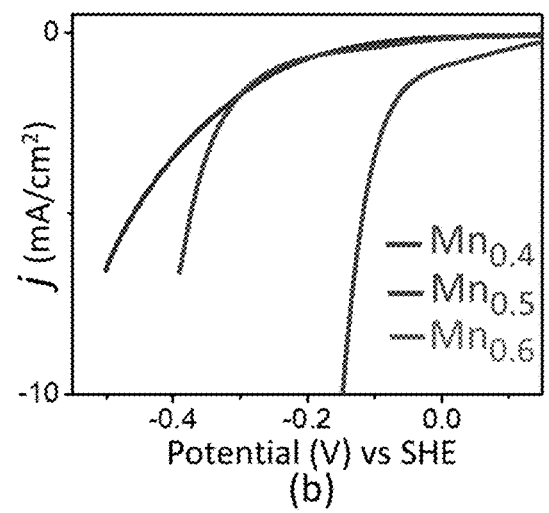

The new catalyst, CaSrFe0.75Co0.75Mn0.5O6-δ (CSFCM), is an oxygen-deficient perovskite, where some oxygen sites are vacant. The structural framework is similar to that of a perovskite (FIG. 1), but with partial occupancy on oxygen sites, as shown in Table 1. The oxygen-vacancies have a disordered distribution in the crystal lattice, which forms a cubic Pm-3m structure, as demonstrated by Rietveld refinement with X-ray diffraction data in FIG. 1. It is noted that the formation of the cubic structure is a function of the Mn stoichiometry. As shown in FIG. 2, the structure of materials in the series $CaSrFe_{1-x}Co_{1-x}Mn_{2x}O_{6-\delta}$ changes as the Mn concentration is increased systematically. The materials with 2x=0-0.2 form structures, where the oxygen vacancies are ordered, leading to the so-called brownmillerite type structure (FIG. 2), where the transition metals have alternating octahedral and tetrahedral coordination.[33] The 2x=0.3 phase is an intermediate where the transformation of brownmillerite to cubic perovskite structure begins. The 2x=0.4 compound shows cubic structure, with relatively wide diffraction peaks, which indicate that transformation to the cubic structure is not complete. Finally, the compounds with 2x=0.5-1.0 show cubic perovskite structure. Interestingly, among all phases, the 2x=0.5 compound shows the highest electrocatalytic activity (FIG. 3). Therefore, this material was studied in great detail to examine its structure-property relationships. Oxygen vacancies have been found to influence the catalytic activity of perovskite-based catalysts.[34-36] Therefore, iodometric titrations were carried out to determine the degree of oxygen-deficiency in $CaSrFe_{0.75}Co_{0.75}Mn_{0.5}O_{6-\delta}$. These titrations showed δ=0.56, for this compound, which indicates a significant degree of oxygen-deficiency. Clearly the presence of these oxygen-vacancies has an impact on the valence states of transition metals, which were studied by X-ray absorption spectroscopy, as described in the next section.

TABLE 1

Atomic positions of $CaSrFe_{0.75}Co_{0.75}Mn_{0.5}O_{6-\delta}$, a = 3.8312(1) Å

| | x | y | z | $U_{150}$ | multiplicity | occupancy |
|---|---|---|---|---|---|---|
| Ca/Sr | 0.5 | 0.5 | 0.5 | 0.0138(8) | 1 | 0.50/0.50 |
| Fe/Co/Mn | 0.0 | 0.0 | 0.0 | 0.031(1) | 1 | 0.375/0.375/0.250 |
| O | 0.5 | 0.0 | 0.0 | 0.048(1) | 3 | 0.91 |

3.2. Hydrogen-Evolution Activity

Since HER catalysts are commonly investigated in either alkaline, i.e., 1M KOH,[12, 30, 37] or acidic media, 0.1M $HClO_4$[12, 37-38] and 0.5 M $H_2SO_4$[29-30, 39], we examined CSFCM under all of these conditions. Although oxygen-deficient perovskites show good OER performance, very few compounds from this class of materials show catalytic activity for HER. The few examples that have been reported, are HER-active in alkaline environment.[14-15] Even less common are perovskite-type oxides based on non-precious metals that show HER activity in acidic media. A brief report on La-based perovskites shows very low HER in acidic condition.[16] To our knowledge there has been no report of high HER activity of a perovskite oxide in acidic media.

Remarkably, CSFCM shows outstanding HER activity in both acidic and basic conditions (FIG. 5), an unprecedented property for a perovskite-type oxide. Based on the HER mechanism, the activity in acidic condition is expected to be greater than that in alkaline media,[40] due to the reaction pathways. The generally accepted mechanism for HER involves Volmer reaction, followed by either Heyrovsky or Tafel reaction, as shown below:[37, 41]

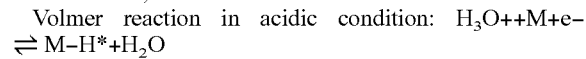
Volmer reaction in acidic condition: $H_3O^+ + M + e^- \rightleftharpoons M-H^* + H_2O$

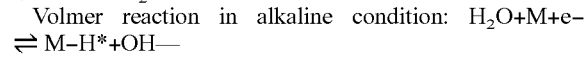
Volmer reaction in alkaline condition: $H_2O + M + e^- \rightleftharpoons M-H^* + OH^-$

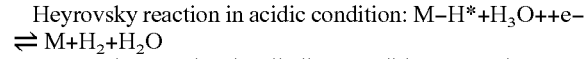
Heyrovsky reaction in acidic condition: $M-H^* + H_3O^+ + e^- \rightleftharpoons M + H_2 + H_2O$

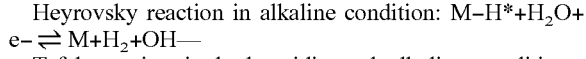
Heyrovsky reaction in alkaline condition: $M-H^* + H_2O + e^- \rightleftharpoons M + H_2 + OH^-$

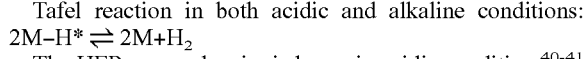
Tafel reaction in both acidic and alkaline conditions: $2M-H^* \rightleftharpoons 2M + H_2$ The HER energy barrier is lower in acidic condition,[40-41] where the O—H bond between hydrated proton and water molecule should be dissociated. Whereas, in alkaline condition, the reaction mechanism involves the dissociation of O—H bond within water molecules, which demands considerably higher energy barrier.[37, 40] In addition, the transport of proton in solution is faster than that of OH−.[40]

The new catalyst, CSFCM, shows higher HER activity in acidic condition. The onset potential where the electrocatalytic activity commences and the polarization curve begins to depart from a flat line is one of the parameters used for comparing the activity of HER catalysts. Also, by convention, the overpotential required to achieve the current density of 10 mA/cm² ($\eta10$) is taken as indicative of the performance of an electrocatalyst.[42-43] CSFCM, shows respectable HER activity in alkaline condition, as shown in FIG. 5. However, a more remarkable property is this catalyst's outstanding HER activity in acidic condition. A shown in FIG. 5, in acidic media, CSFCM shows onset and overpotential ($\eta10$) of −0.077 V and −0.145 V, respectively. This is an unprecedented HER performance for a perovskite-based oxide, and is comparable or better than that of some of the best new catalysts prepared through elaborate fabrication methods, such as thin film directed polymorphs of $Ti_2O_3$ ($\eta10$=0.271-0.495 V),[44] basal plane activated $MoS_2$ ($\eta10$=0.194 V),[29] electrochemically activated nanocrystals of 1T' polymorph of $MoTe_2$ ($\eta10$=0.178 V),[31] and defective multilayered $MoS_2$ modified to contain ultrarich S vacancies and large regions of undercoordinated Mo atoms ($\eta10$=0.16 V).[39] It is noted that while some other catalysts show comparable overpotential,[30] they often require additional fabrication and modifications in order to enhance their activity. The advantage of CSFCM is that it is the first perovskite oxide to shows high HER activity in both acidic and basic conditions, and it is capable of doing so in bulk form with no additional processing. As shown in FIG. 5, it also shows remarkable stability over 12 hours.

The kinetics of HER is commonly examined based on the equation $\eta = a + b \log j$. The slope of Tafel plot, $\eta$ vs. log j (FIG. 5) is indicative of the reaction rate. Smaller slope (b) indicates smaller overpotential required to deliver the same current density increment, which implies faster electron-transfer and enhanced reaction kinetics.[37] The Tafel slope for CSFCM in acidic condition is 80 mV/dec, which is comparable to some of the highly active HER catalysts.[29, 44]

3.3. Oxygen-Evolution Activity

Figure 4A:
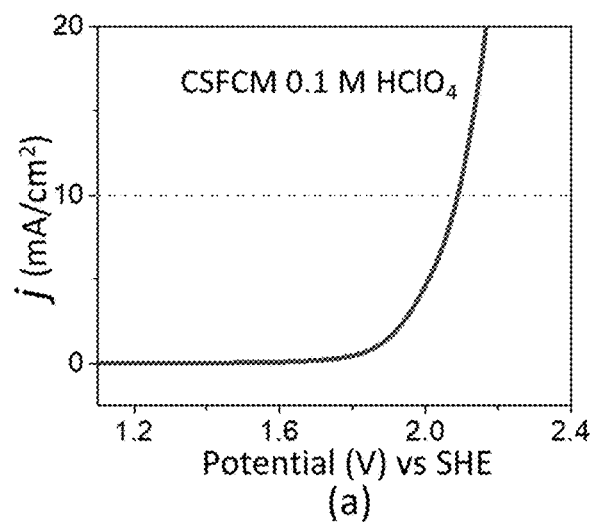
Figure 4B:
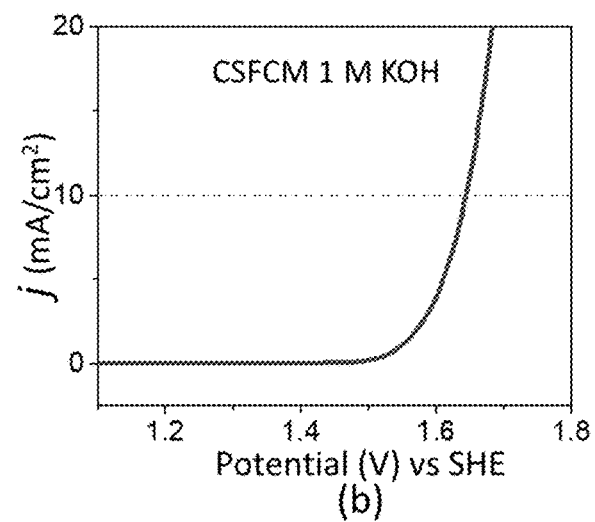

The OER activity was studied for CSFCM along with that of the precious metal catalyst $RuO_2$. Carbon black is generally added to the electrode composition during OER measurements in order to enhance the conductivity within the electrode and improve the utilization of the catalyst.[45-47] However, recent studies have shown that the role of carbon is more complex than originally thought.[48-49] For example, it has been shown that during the preparation of $Ba_{0.5}Sr_{0.5}Co_{0.8}Fe_{0.2}O_{3-\delta}$/carbon composite electrode, cobalt does not retain its valency and gets reduced.[50] Therefore, OER experiments without carbon black are adopted by some researchers to avoid the interference from carbon.[51] We performed the OER experiments for the new compound, CSFCM, both with and without carbon black. Both methods gave similar results, indicating that the catalytic performance of this compound is not dependent on carbon black. The experiments without carbon are more desirable, as they demonstrate the intrinsic catalytic performance of the catalyst, without any contribution form carbon. Therefore, we used this method for further studies, where the catalyst was dropcast on the surface of a glassy carbon electrode without the addition of carbon black powder. The OER experiments are commonly done in 0.1 M KOH. We used the same condition to be able to directly compare our results to those reported for other catalysts. However, other conditions (1 M KOH and 0.1 M $HClO_4$) were also tested as shown in FIG. 4. The best results were those of 0.1 M KOH, which is the typical OER condition.[1, 6-9]

In addition, given the fundamental nature of this study, methods of investigation of the OER activity, that can further examine the intrinsic catalytic properties by eliminating all other contributions, are highly desired. One of the electrode components that is nearly always used in OER studies is glassy carbon electrode, on which the catalyst is dropcasted. The glassy carbon electrode provides high electrical conductivity, while the catalyst film facilitates the OER. Recently some researchers have examined pure disks of catalytic materials to eliminate all electrode components, even the glassy carbon electrode.[52-53] The advantages of this method are clear, as it allows the investigation of the intrinsic properties of a material by eliminating all other interferences and contributions. Given that the magnitude of OER potential is greater than that of HER, we speculated that the conductivity of the catalyst might be enough to be used alone without being loaded on glassy carbon electron. Therefore, in addition to conventional glassy carbon method, we also conducted OER experiments using pure disks of the catalyst. It is noted that other catalysts, such as $RuO_2$ and BSCF do not perform well as pure disks, as they are poor electrical conductors. Again, the onset potential and the overpotential beyond the ideal potential of 1.23 V (at 10 mA/cm²) were evaluated. In 0.1 M KOH, the conventional dropcast experiments for CSFCM give onset potential of 1.45 V and overpotential of $\eta10 \approx 0.31$ V (FIG. 6). The pure disks of CSFCM show onset potential of 1.30 V and overpotential of $\eta10 \approx 0.19$ V (FIG. 6). In pure disk experiments, the whole surface of the disk contributes to the OER, leading to the enhanced overpotential. As shown in FIG. 6, CSFCM disk shows excellent performance even up to 1000 cycles. The remarkable performance of CSFCM becomes more evident when its activity is compared with that of the precious metal catalyst $RuO_2$ (FIG. 6), which shows overpotential of $\eta10 \approx 0.42$ V.[54] Its activity is also superior to the highly regarded perovskite oxide BSCF, with overpotential of $\eta10 \approx 0.05$ V.[1, 7]

The kinetics of the reaction was evaluated using the Tafel plot, as commonly utilized for OER.[1, 6-9] As shown in FIG. 6, the Tafel slope for CSFCM is 70 mV/dec, whereas $RuO_2$ shows Tafel slope of 79 mV/dec. This is consistent with the high OER activity of CSFCM and indicates the facile charge transport and enhanced kinetics.[55]

We also determined the electrochemically active surface area (ECSA) of CSFCM, as compared to BSCF and $RuO_2$. This was done using the electrochemical double layer capacitance ($C_{dl}$) of the catalysts using cyclic voltammetry in non-faradic region,[56] where electrode reactions are negligible and the electrical double layer charge and discharge is the main source of the current.[56-57] The ECSA value is related to $C_{dl}$ through the relationship ECSA=$C_{dl}/C_s$, where Cs is specific capacitance.[56, 58-59] Irrespective of the $C_s$ value, the proportionality between the double layer capacitance, $C_{dl}$, and the electrochemically active surface area electrode (ECSA) is evident from the above formula.[60-63] Therefore, it is routine practice to take $C_{dl}$ as a representative of the magnitude of ECSA.[61-63] The $C_{dl}$ value is obtained using the equation $C_{dl} = \Delta j/v$,[61-63] where $\Delta j$ is the absolute value of the difference between $j_{anodic}$ and $j_{catodic}$ in cyclic voltammetry data and v is the scan rate.[61-63] Usually, $\Delta j$ is plotted against v, and the value of $C_{dl}$ is determined as half of the slope of this plot.[61-63] Alternatively, some researchers have used the plot of $j_{average}$ versus v, where $j_{average}$ is the average of the absolute values of $j_{anodic}$ and $j_{catodic}$,[60, 64] and the slope is equivalent to $C_{dl}$ without the need to divide by 2.60. FIG. 7 shows the plot of $\Delta j$ at the middle potential,[62] 0.977 V, against the corresponding scan rates. The value of $C_{dl}$ is determined by dividing the slope of this plot by 2.[61-63] As shown in FIG. 4, the $C_{dl}$ for CSFCM is considerably larger than that of $RuO_2$, indicating greater electrochemically active surface area (ECSA) for CSFCM, which matches the high OER activity of this compound.

REFERENCES

1. Suntivich, J.; May, K. J.; Gasteiger, H. A.; Goodenough, J. B.; Shao-Horn, Y., A perovskite oxide optimized for oxygen evolution catalysis from molecular orbital principles. Science 2011, 334, 1383-1385.
2. Gray, H. B., Powering the planet with solar fuel. Nat. Chem. 2009, 1, 7.
3. Lu, Y. C.; Xu, Z.; Gasteiger, H. A.; Chen, S.; Hamad-Schifferli, K.; Shao-Horn, Y., Platinum-gold nanoparticles: a highly active bifunctional electrocatalyst for rechargeable lithium-air batteries. J. Am. Chem. Soc. 2010, 132, 12170-12171.
4. Kumar, A.; Leonard, D.; Jesse, S.; Ciucci, F.; Eliseev, E. A.; Morozovska, A. N.; Biegalski, M. D.; Christen, H. M.; Tselev, A.; Mutoro, E.; Crumlin, E. J.; Morgan, D.; Shao-Horn, Y.; Borisevich, A.; Kalinin, S. V., Spatially resolved mapping of oxygen reduction/evolution reaction on solid-oxide fuel cell cathodes with sub-10 nm resolution. ACS Nano 2013, 7, 3808-3814.
5. Koper, M. T. M., Thermodynamic theory of multi-electron transfer reactions: Implications for electrocatalysis. J. Electroanal. Chem. 2011, 660, 254-260.
6. Hona, R. K.; Ramezanipour, F., Remarkable Oxygen-Evolution Activity of a Perovskite Oxide from the Ca2-xSrxFe2O6-δ Series. Angew. Chem. Int. Ed. 2019, 58, 2060-2063.
7. Zhu, Y.; Zhou, W.; Chen, Z. G.; Chen, Y.; Su, C.; Tadé, M. O.; Shao, Z., SrNb0.1Co0.7Fe0.2O3-δ perovskite as a next-generation electrocatalyst for oxygen evolution in alkaline solution. Angew. Chem. Int. Ed. 2015, 54, 3897-3901.
8. Su, C.; Wang, W.; Chen, Y.; Yang, G.; Xu, X.; Tadé, M. O.; Shao, Z., SrCo0.9Ti0.1O3-δ as a new electrocatalyst for the oxygen evolution reaction in alkaline electrolyte with stable performance ACS Appl. Mater. Interfaces 2015, 7, 17663-17670.
9. He, D.; He, G.; Jiang, H.; Chen, Z.; Huang, M., Enhanced durability and activity of the perovskite electrocatalyst Pr0.5Ba0.5CoO3-δ by Ca doping for the oxygen evolution reaction at room temperature. Chem. Commun. 2017, 53, 5132-5135.
10. Yang, F.; Kang, N.; Yan, J.; Wang, X.; He, J.; Huo, S.; Song, L., Hydrogen Evolution Reaction Property of Molybdenum Disulfide/Nickel Phosphide Hybrids in Alkaline Solution. Metals 2018, 8, 359.
11. Benson, J.; Li, M.; Wang, S.; Wang, P.; Papakonstantinou, P., Electrocatalytic Hydrogen Evolution Reaction on Edges of a Few Layer Molybdenum Disulfide Nanodots. ACS Appl. Mater. Interfaces 2015, 7, 14113-14122.
12. Ma, L.; Ting, L. R. L.; Molinari, V.; Giordano, C.; Yeo, B. S., Efficient hydrogen evolution reaction catalyzed by molybdenum carbide and molybdenum nitride nanocatalysts synthesized via the urea glass route. J. Mater. Chem. A 2015, 3, 8361-8368.
13. Nayak, A. K.; Verma, M.; Sohn, Y.; Deshpande, P. A.; Pradhan, D., Highly Active Tungsten Oxide Nanoplate Electrocatalysts for the Hydrogen Evolution Reaction in Acidic and Near Neutral Electrolytes. 2017, 2, 7039-7047.
14. Xu, X.; Chen, Y.; Zhou, W.; Zhu, Z.; Su, C.; Liu, M.; Shao, Z., A Perovskite Electrocatalyst for Efficient Hydrogen Evolution Reaction. Adv. Mater. 2016, 28, 6442-6448.
15. Wang, J.; Gao, Y.; Chen, D.; Liu, J.; Zhang, Z.; Shao, Z.; Ciucci, F., Water Splitting with an Enhanced Bifunctional Double Perovskite. ACS Catal. 2018, 8, 364-371.
16. Galal, A.; Atta, N. F.; Ali, S. M., Investigation of the catalytic activity of LaBO3 (B=Ni, Co, Fe or Mn) prepared by the microwave-assisted method for hydrogen evolution in acidic medium. Electrochim. Acta 2011, 56, 5722-5730.
17. Grimaud, A.; May, K. J.; Carlton, C. E.; Lee, Y. L.; Risch, M.; Hong, W. T.; Zhou, J.; Shao-Horn, Y., Double Perovskites as a Family of Highly Active Catalysts for Oxygen Evolution in Alkaline Solution. Nat. Commun. 2013, 4, 2439.
18. Wang, C.; Zeng, L.; Guo, W.; Gong, C.; Yang, J , Enhancing oxygen and hydrogen evolution activities of perovskite oxide LaCoO3 via effective doping of platinum. RSC Adv. 2019, 9, 35646-35654.
19. Zhang, Z.; Chen, Y.; Dai, Z.; Tan, S.; Chen, D., Promoting hydrogen-evolution activity and stability of perovskite oxides via effectively lattice doping of molybdenum. Electrochim. Acta 2019, 312, 128-136. 14
20. Shan, J.; Ling, T.; Davey, K.; Zheng, Y.; Qiao, S.-Z., Transition-Metal-Doped RuIr Bifunctional Nanocrystals for Overall Water Splitting in Acidic Environments. Adv. Mater. 2019, 31, 1900510.
21. Duan, H.; Li, D.; Tang, Y.; He, Y.; Ji, S.; Wang, R.; Lv, H.; Lopes, P. P.; Paulikas, A. P.; Li, H.; Mao, S. X.; Wang, C.; Markovic, N. M.; Li, J.; Stamenkovic, V. R.; Li, Y., High-Performance Rh2P Electrocatalyst for Efficient Water Splitting. J. Am. Chem. Soc. 2017, 139, 5494-5502.
22. Wang, W.; Xi, S.; Shao, Y.; Sun, W.; Wang, S.; Gao, J.; Mao, C.; Guo, X.; Li, G., Oxide Passivated CoNi@NC-Supported Ru(OH)xCly Cluster as Highly Efficient Catalysts for the Oxygen and Hydrogen Evolution. ACS Sustainable Chem. Eng. 2019, 7, 17227-17236.
23. Jin, H.; Wang, J.; Su, D.; Wei, Z.; Pang, Z.; Wang, Y., In situ Cobalt-Cobalt Oxide/N-Doped Carbon Hybrids As Superior Bifunctional Electrocatalysts for Hydrogen and Oxygen Evolution. J. Am. Chem. Soc. 2015, 137, 2688-2694.
24. Yue, X.; Zheng, Y.; Chen, Y.; Huang, S., Overall water splitting on Ni0.19WO4 nanowires as highly efficient and durable bifunctional non-precious metal electrocatalysts. Electrochim. Acta 2020, 333, 135554.
25. Zhu, Y.; Zhou, W.; Zhong, Y.; Bu, Y.; Chen, X.; Zhong, Q.; Liu, M.; Shao, Z., A Perovskite Nanorod as Bifunctional Electrocatalyst for Overall Water Splitting. Adv. Energy Mater. 2017, 7, 1602122.
26. Larson, A. C.; Von Dreele, R. B., General structure analysis system (GSAS), Los Alamos National Laboratory Report LAUR. 1994, 86-748.
27. Toby, B. H., EXPGUI, a graphical user interface for GSAS. J. Appl. Crystallogr. 2001, 34, 210-213.
28. Jeerage, K. M.; Candelaria, S. L.; Stavis, S. M., Rapid Synthesis and Correlative Measurements of Electrocatalytic Nickel/Iron Oxide Nanoparticles. Sci. Rep. 2018, 8 (1), 4584.
29. Wu, W.; Niu, C.; Wei, C.; Jia, Y.; Li, C.; Xu, Q., Activation of MoS2 Basal Planes for Hydrogen Evolution by Zinc. Angew. Chem. Int. Ed. 2019, 58, 2029-2033.

30. Zhu, J.; Wang, Z.-C.; Dai, H.; Wang, Q.; Yang, R.; Yu, H.; Liao, M.; Zhang, J.; Chen, W.; Wei, Z.; Li, N.; Du, L.; Shi, D.; Wang, W.; Zhang, L.; Jiang, Y.; Zhang, G., Boundary activated hydrogen evolution reaction on monolayer MoS2. *Nat. Commun.* 2019, 10, 1348.

31. McGlynn, J. C.; Dankwort, T.; Kienle, L.; Bandeira, N. A. G.; Fraser, J. P.; Gibson, E. K.; Cascallana-Matías, I.; Kamarás, K.; Symes, M. D.; Miras, H. N.; Ganin, A. Y., The rapid electrochemical activation of MoTe2 for the hydrogen evolution reaction. *Nat. Commun.* 2019, 10, 4916.

32. Yang, W.; Kim, J. H.; Hutter, O. S.; Phillips, L. J.; Tan, J.; Park, J.; Lee, H.; Major, J. D.; Lee, J. S.; Moon, J., Benchmark performance of low-cost Sb2Se3 photocathodes for unassisted solar overall water splitting. *Nat. Commun.* 2020, 11, 861.

33. Hona, R. K.; Huq, A.; Ramezanipour, F., Unraveling the role of structural order in the transformation of electrical conductivity in Ca2FeCoO6-δ, CaSrFeCoO6-δ, and Sr2FeCoO6-δ. *Inorg. Chem.* 2017, 56, 14494-14505.

34. Kim, N. I.; Afzal, R. A.; Choi, S. R.; Lee, S. W.; Ahn, D.; Bhattacharjee, S.; Lee, S. C.; Kim, J. H.; Park, J. Y., Highly active and durable nitrogen doped-reduced graphene oxide/double perovskite bifunctional hybrid catalysts. *J. Mater. Chem. A* 2017, 5, 13019-13031.

35. Kim, J.; Yin, X.; Tsao, K. C.; Fang, S.; Yang, H., Ca2Mn2O5 as oxygen-deficient perovskite electrocatalyst for oxygen evolution reaction. *J. Am. Chem. Soc.* 2014, 136, 14646-14649.

36. Du, J.; Zhang, T.; Cheng, F.; Chu, W.; Wu, Z.; Chen, J., Nonstoichiometric perovskite CaMnO3-δ for oxygen electrocatalysis with high activity. *Inorg. Chem.* 2014, 53, 9106-9114.

37. Zhu, J.; Hu, L.; Zhao, P.; Lee, L. Y. S.; Wong, K.-Y., Recent Advances in Electrocatalytic Hydrogen Evolution Using Nanoparticles. *Chem. Rev.* 2020, 120, 851-918.

38. Šljukić, B.; Vujković, M.; Amaral, L.; Santos, D. M. F.; Rocha, R. P.; Sequeira, C. A. C.; Figueiredo, J. L., Carbon-supported Mo2C electrocatalysts for hydrogen evolution reaction. *J. Mater. Chem. A* 2015, 3, 15505-15512.

39. Li, L.; Qin, Z.; Ries, L.; Hong, S.; Michel, T.; Yang, J.; Salameh, C.; Bechelany, M.; Miele, P.; Kaplan, D.; Chhowalla, M.; Voiry, D., Role of Sulfur Vacancies and Undercoordinated Mo Regions in MoS2 Nanosheets toward the Evolution of Hydrogen. *ACS Nano* 2019, 13, 6824-6834. 15

40. Zheng, Y.; Jiao, Y.; Vasileff, A.; Qiao, S.-Z., The Hydrogen Evolution Reaction in Alkaline Solution: From Theory, Single Crystal Models, to Practical Electrocatalysts. *Angew. Chem. Int. Ed.* 2018, 57, 7568-7579.

41. Shinagawa, T.; Garcia-Esparza, A. T.; Takanabe, K., Insight on Tafel slopes from a microkinetic analysis of aqueous electrocatalysis for energy conversion. *Sci. Rep.* 2015, 5, 13801.

42. Hwang, B.-J.; Chen, H.-C.; Mai, F.-D.; Tsai, H.-Y.; Yang, C.-P.; Rick, J.; Liu, Y.-C., Innovative Strategy on Hydrogen Evolution Reaction Utilizing Activated Liquid Water. *Sci. Rep.* 2015, 5, 16263.

43. Mohammed-Ibrahim, J.; Sun, X., Recent progress on earth abundant electrocatalysts for hydrogen evolution reaction (HER) in alkaline medium to achieve efficient water splitting—A review. *J. Energy Chem.* 2019, 34, 111-160.

44. Li, Y.; Yu, Z. G.; Wang, L.; Weng, Y.; Tang, C. S.; Yin, X.; Han, K.; Wu, H.; Yu, X.; Wong, L. M.; Wan, D.; Wang, X. R.; Chai, J.; Zhang, Y.-W.; Wang, S.; Wang, J.; Wee, A. T. S.; Breese, M. B. H.; Pennycook, S. J.; Venkatesan, T.; Dong, S.; Xue, J. M.; Chen, J., Electronic-reconstruction-enhanced hydrogen evolution catalysis in oxide polymorphs. *Nat. Commun.* 2019, 10, 3149.

45. Malkhandi, S.; Trinh, P.; Manohar, A. K.; Jayachandrababu, K. C.; Kindler, A.; Surya Prakash, G. K.; Narayanan, S. R., Electrocatalytic activity of transition metal oxide-carbon composites for oxygen reduction in alkaline batteries and fuel cells. *J. Electrochem. Soc.* 2013, 160, 943-952.

46. May, K. J.; Carlton, C. E.; Stoerzinger, K. A.; Risch, M.; Suntivich, J.; Lee, Y. L.; Grimaud, A.; Shao Horn, Y., Influence of oxygen evolution during water oxidation on the surface of perovskite oxide catalysts. *J. Phys. Chem. Lett.* 2012, 3, 3264-3270.

47. Jin, C.; Cao, X.; Zhang, L.; Zhang, C.; Yang, R., Preparation and electrochemical properties of urchin-like La0.8Sr0.2MnO3 perovskite oxide as a bifunctional catalyst for oxygen reduction and oxygen evolution reaction. *J. Power Sources* 2013, 241, 225-230.

48. Mohamed, R.; Cheng, X.; Fabbri, E.; Levecque, P.; Kötz, R.; Conrad, O.; Schmidt, T. J., Electrocatalysis of perovskites: the influence of carbon on the oxygen evolution activity. *J. Electrochem. Soc.* 2015, 162, 579-586.

49. Liang, Y.; Li, Y.; Wang, H.; Zhou, J.; Wang, J.; Regier, T.; Dai, H., Co3O4 nanocrystals on graphene as a synergistic catalyst for oxygen reduction reaction. *Nat. Mater.* 2011, 10, 780-786.

50. Fabbri, E.; Nachtegaal, M.; Cheng, X.; Schmidt Thomas, J., Superior bifunctional electrocatalytic activity of Ba0.5Sr0.5Co0.8Fe0.2O3-δ/carbon composite electrodes: insight into the local electronic structure. *Adv. Energy Mater.* 2015, 5, 1402033.

51. Cheng, X.; Fabbri, E.; Nachtegaal, M.; Castelli, I. E.; El Kazzi, M.; Haumont, R.; Marzari, N.; Schmidt, T. J., Oxygen evolution reaction on La1-xSrxCoO3 perovskites: a combined experimental and theoretical study of their structural, electronic, and electrochemical properties. *Chem. Mater.* 2015, 27, 7662-7672.

52. Chen, Y.; Yu, G.; Chen, W.; Liu, Y.; Li, G.-D.; Zhu, P.; Tao, Q.; Li, Q.; Liu, J.; Shen, X.; Li, H.; Huang, X.; Wang, D.; Asefa, T.; Zou, X., Highly Active, Nonprecious Electrocatalyst Comprising Borophene Subunits for the Hydrogen Evolution Reaction. *J. Am. Chem. Soc.* 2017, 139, 12370-12373.

53. Adolphsen, J. Q.; Sudireddy, B. R.; Gil, V.; Chatzichristodoulou, C., Oxygen Evolution Activity and Chemical Stability of Ni and Fe Based Perovskites in Alkaline Media. *J. Electrochem. Soc.* 2018, /65, 827-835.

54. Das, D.; Das, A.; Reghunath, M.; Nanda, K. K., Phosphine-free avenue to Co2P nanoparticle encapsulated N,P co-doped CNTs: a novel non-enzymatic glucose sensor and an efficient electrocatalyst for oxygen evolution reaction. *Green Chem.* 2017, 19, 1327-1335.

55. Song, F.; Hu, X., Ultrathin cobalt-manganese layered double hydroxide Is an efficient oxygen evolution catalyst. *J. Am. Chem. Soc.* 2014, 136, 16481-16484.

56. Jung, S.; McCrory, C. C. L.; Ferrer, I. M.; Peters, J. C.; Jaramillo, T. F., Benchmarking nanoparticulate metal oxide electrocatalysts for the alkaline water oxidation reaction. *J. Mater. Chem. A* 2016, 4, 3068-3076.

57. Lu, B.; Cao, D.; Wang, P.; Wang, G.; Gao, Y., Oxygen evolution reaction on Ni-substituted Co3O4 nanowire array electrodes. *Int. J. Hydrogen Energy* 2011, 36, 72-78.

58. Lee, J. G.; Hwang, J.; Hwang, H. J.; Jeon, O. S.; Jang, J.; Kwon, O.; Lee, Y.; Han, B.; Shul, Y.-G., A new family of perovskite catalysts for oxygen-evolution reaction in alkaline media: BaNiO3 and BaNi0.83O2.5. *J. Am.Chem. Soc.* 2016, 138, 3541-3547.
59. Oh, S.; Kim, H.; Kwon, Y.; Kim, M.; Cho, E.; Kwon, H., Porous Co—P foam as an efficient bifunctional electrocatalyst for hydrogen and oxygen evolution reactions. *J. Mater. Chem. A* 2016, 4, 18272-18277.
60. Petrie, J. R.; Cooper, V. R.; Freeland, J. W.; Meyer, T. L.; Zhang, Z.; Lutterman, D. A.; Lee, H. N., Enhanced bifunctional oxygen catalysis in strained LaNiO3 perovskites. *J. Am. Chem. Soc.* 2016, 138, 2488-2491.
61. Zhang, B.; Lui, Y. H.; Zhou, L.; Tang, X.; Hu, S., An alkaline electro-activated Fe—Ni phosphide nanoparticle-stack array for high-performance oxygen evolution under alkaline and neutral conditions. *J. Mater. Chem. A* 2017, 5, 13329-13335.
62. Pan, Y.; Chen, Y.; Li, X.; Liu, Y.; Liu, C., Nanostructured nickel sulfides: phase evolution, characterization and electrocatalytic properties for the hydrogen evolution reaction. *RSC Advances* 2015, 5, 104740-104749.
63. Konkena, B.; junge Puring, K.; Sinev, I.; Piontek, S.; Khavryuchenko, O.; Dürholt, J. P.; Schmid, R.; Tüysüz, H.; Muhler, M.; Schuhmann, W.; Apfel, U.-P., Pentlandite rocks as sustainable and stable efficient electrocatalysts for hydrogen generation. *Nat. Commun.* 2016, 7, 12269.
64. Zhu, Y.; Zhou, W.; Sunarso, J.; Zhong, Y.; Shao, Z., Phosphorus-doped perovskite oxide as highly efficient water oxidation electrocatalyst in alkaline solution. *Adv. funct. mater.* 2016, 26, 5862-5872.

While the invention has been described in terms of its preferred embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

We claim:
1. A catalytic material with formula: $Ca_{2-y}Sr_yFe_{1-x}Co_{1-x}Mn_{2x}O_{6-\delta}$ where y=0.10-1.90 and x=0.05-0.95.
2. The catalytic material of claim 1, wherein the formula is $CaSrFe_{0.75}Co_{0.75}Mn_{0.5}O_{6-\delta}$.
3. A catalyst ink comprising the catalytic material of claim 1 and a liquid carrier.
4. A method of making a catalytic electrode using the catalytic material of claim 1, comprising
   i) mixing the catalytic material and a carrier to form a catalytic ink, and coating the catalytic ink onto a substrate to form the catalytic electrode; or
   ii) forming a solid catalytic electrode from the catalytic material.
5. The method of claim 4, wherein the step of coating is performed by drop casting.
6. The method of claim 4, wherein the catalytic ink further comprises carbon black.
7. The method of claim 4, wherein the carrier comprises one or more of water, an alcohol, and a solvent.
8. The method of claim 4, wherein the substrate is a glassy carbon electrode.
9. The method of claim 4, wherein the substrate does not comprise carbon.
10. A method of catalyzing a hydrogen evolution reaction (HER), comprising
    contacting water with the catalytic material of claim 1, wherein the step of contacting is performed under conditions that permit catalysis of the HER by the catalytic material.
11. The method of claim 10, wherein the conditions that permit catalysis include performing the step of contacting under strongly acidic conditions or under strongly basic conditions.
12. A method of catalyzing an oxygen evolution reaction (OER), comprising
    contacting water with the catalytic material of claim 1, wherein the step of contacting is performed under conditions that permit catalysis of the OER by the catalytic material.
13. The method of claim 12, wherein the conditions that permit catalysis include performing the step of contacting under strongly acidic conditions.
14. A device comprising the catalytic material of claim 1.
15. The device of claim 14, wherein the device is an electrolyzer.
16. An electrode comprising $Ca_{2-y}Sr_yFe_{1-x}Co_{1-x}Mn_{2x}O_{6-\delta}$ where y=0.10-1.90 and x=0.05-0.95.
17. The electrode of claim 16 wherein the electrode does not comprise carbon.
18. A method of making the catalytic material $Ca_{2-y}Sr_yFe_{1-x}Co_{1-x}Mn_{2x}O_{6-\delta}$ where y=0.10-1.90 and x=0.05-0.95, comprising
    grinding stoichiometric proportions of a solid compound comprising Ca, a solid compound comprising Sr, a solid compound comprising Fe, a solid compound comprising Mn and a solid compound comprising Co to form a ground mixture;
    compressing the ground mixture to form a compressed mixture; and
    i) sintering the compressed mixture to form a sintered compressed mixture and
    ii) cooling the sintered compressed mixture; or
    iii) grinding the compressed mixture to form a powder,
    iv) recompressing and calcining the compressed mixture,
    v) sintering the recompressed and calcined mixture, and
    vi) cooling the sintered mixture.
19. The method of claim 18, wherein the step of calcining is performed in air at 1000° C. for 24 hours, and wherein steps i) and v) of sintering are performed in air at 1200° C. for 24 hours.
20. The method of claim 18, wherein the solid compound comprising Ca is $CaCO_3$, CaO, or $Ca(NO_3)_2$; the solid compound comprising Sr is $SrCO_3$, SrO, $Sr(NO_3)_2$; the solid compound comprising Fe is $Fe_2O_3$, FeO, $Fe_3O_4$; the solid compound comprising Mn is $Mn_2O_3$, MnO, $MnO_2$; and the solid compound comprising Co is $Co_3O_4$, CoO.
21. A calcium, strontium, iron, cobalt, manganese oxide perovskite, wherein the calcium strontium, iron, cobalt, manganese oxide perovskite catalyzes a hydrogen evolution reaction.
22. The calcium, strontium, iron, cobalt, manganese oxide perovskite of claim 21 wherein the calcium, strontium, iron, manganese oxide perovskite catalyzes an oxygen evolution reaction.

* * * * *